United States Patent
Iida et al.

(10) Patent No.: US 8,107,787 B2
(45) Date of Patent: Jan. 31, 2012

(54) RECORDING AND REPRODUCING DEVICE AND RECORDING AND REPRODUCING METHOD

(75) Inventors: Kenichi Iida, Saitama (JP); Fumihiko Kato, Kanagawa (JP); Izuru Tanaka, Kanagawa (JP); Satoshi Mihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1918 days.

(21) Appl. No.: 11/212,692

(22) Filed: Aug. 29, 2005

(65) Prior Publication Data

US 2006/0045484 A1 Mar. 2, 2006

(30) Foreign Application Priority Data

Sep. 2, 2004 (JP) .................................. 2004-256201

(51) Int. Cl.
*H04N 5/77* (2006.01)
(52) U.S. Cl. .......... 386/224; 386/225; 386/230; 352/11; 352/19
(58) Field of Classification Search .................. 386/95, 386/224, 225, 230; 286/117; 352/11; 353/19
See application file for complete search history.

(56) References Cited

U.S. PATENT DOCUMENTS

| | | | |
|---|---|---|---|
| 5,812,736 A * | 9/1998 | Anderson | 386/324 |
| 6,335,742 B1 * | 1/2002 | Takemoto | 715/781 |
| 6,970,192 B2 * | 11/2005 | Takayama | 348/231.2 |
| 7,054,545 B2 * | 5/2006 | Ando et al. | 386/241 |
| 7,106,369 B2 * | 9/2006 | Baron | 348/231.4 |
| 2002/0021361 A1 * | 2/2002 | Kitajima et al. | 348/232 |
| 2003/0210898 A1 * | 11/2003 | Juen et al. | 386/117 |
| 2004/0167783 A1 * | 8/2004 | Nagai | 704/270 |
| 2004/0179115 A1 * | 9/2004 | Tomat et al. | 348/231.6 |
| 2005/0223037 A1 * | 10/2005 | Ahn et al. | 707/104.1 |

FOREIGN PATENT DOCUMENTS

| | | |
|---|---|---|
| JP | 06-253255 | 9/1994 |
| JP | 06-276478 | 9/1994 |
| JP | 06276478 A * | 9/1994 |
| JP | 7-184160 | 7/1995 |

(Continued)

OTHER PUBLICATIONS

U.S. Appl. No. 11/020,504, filed Aug. 17, 2005.

(Continued)

*Primary Examiner* — Thai Tran
*Assistant Examiner* — Girumsew Wendmagegn
(74) *Attorney, Agent, or Firm* — Oblon, Spivak, McClelland, Maier & Neustadt, L.L.P.

(57) ABSTRACT

A recording and reproducing device including sound collecting means for collecting external sound, and outputting sound information corresponding to a result of sound collection, photographing means for photographing an outside, and outputting image information corresponding to a result of photographing, recording means for converting the sound information to files in message units and recording the files on a predetermined recording medium, and recording the image information on the recording medium in association with a corresponding file of sound information in response to a predetermined first external operation, display means for displaying images based on image information associated with respective files of sound information, and reproducing means for reproducing a file of sound information associated with an image selected by a predetermined second external operation among the images displayed by the display means. The recording means sets, for each file of sound information, one of images based on image information associated with the file as a representative image of the file.

14 Claims, 10 Drawing Sheets

FOREIGN PATENT DOCUMENTS

| | | |
|---|---|---|
| JP | 10-136299 | 5/1998 |
| JP | 2000-041209 | 2/2000 |
| JP | 2001-069453 | 3/2001 |
| JP | 2001-358980 | 12/2001 |
| JP | 2004-048318 | 2/2004 |
| JP | 2004-134985 | 4/2004 |
| JP | 2004-134986 | 4/2004 |

OTHER PUBLICATIONS

U.S. Appl. No. 11/212,810, filed Aug. 29, 2005.
U.S. Appl. No. 11/216,058, filed Sep. 1, 2005.
U.S. Appl. No. 11/210,862, filed Aug. 25, 2005, Iida, et al.
U.S. Appl. No. 11/213,879, filed Aug. 30, 2005, Iida, et al.
U.S. Appl. No. 11/214,745, filed Aug. 31, 2005, Iida, et al.

* cited by examiner

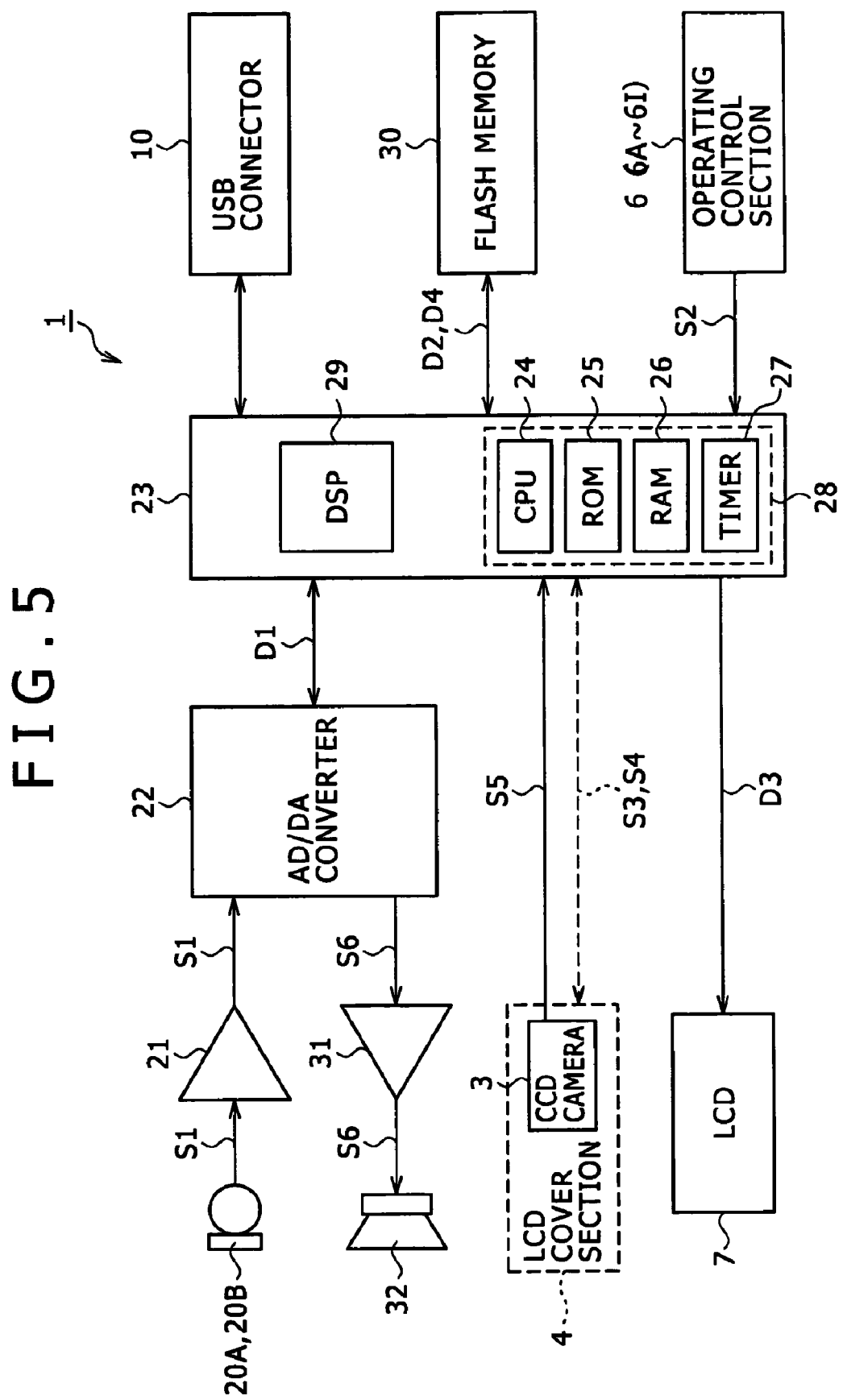

RECORDING AND REPRODUCING DEVICE AND RECORDING AND REPRODUCING METHOD

BACKGROUND OF THE INVENTION

The present invention relates to a recording and reproducing device and a recording and reproducing method, and is suitable for application when sound information and image information are recorded and reproduced, for example.

An electronic camera is conventionally proposed which records sound and takes a still image simultaneously, and establishes temporal relation between the sound and the still image so that the still image is reproduced in parallel with sound contents at a time of reproduction of the sound (see Japanese Patent Laid-Open No. 2001-69453, for example).

SUMMARY OF THE INVENTION

The thus configured electronic camera only establishes temporal relation between sound and still images and reproduces the sound and the still images. Therefore sound contents at points in time associated with the still images cannot be grasped in advance.

The present invention has been made in view of the above point, and it is desirable to propose a recording and reproducing device and a recording and reproducing method that can improve ease of search.

According to an embodiment of the present invention, there is provided a recording and reproducing device including: sound collecting means for collecting external sound, and outputting sound information corresponding to a result of sound collection; photographing means for photographing an outside, and outputting image information corresponding to a result of photographing; recording means for converting the sound information to files in message units and recording the files on a predetermined recording medium, and recording the image information on the recording medium in association with a corresponding file of sound information in response to a predetermined first external operation; display means for displaying images based on image information associated with respective files of sound information; and reproducing means for reproducing a file of sound information associated with an image selected by a predetermined second external operation among the images displayed by the display means; wherein the recording means sets, for each file of sound information, one of images based on image information associated with the file as a representative image of the file.

Thus, this recording and reproducing device can automatically set a representative image for each message without requiring a complicated user operation, and perform reproduction after a sound content of each message is visually and intuitively grasped in advance on the basis of the representative image.

According to another embodiment of the present invention, there is provided a recording and reproducing method including: a first step for converting sound information obtained by collecting external sound to files in message units and recording the files on a predetermined recording medium, and recording image information obtained by photographing an outside on the recording medium in association with a corresponding file of sound information in response to a predetermined first external operation; a second step for displaying images based on image information associated with respective files of sound information; and a third step for reproducing a file of sound information associated with an image selected by a predetermined second external operation among the displayed images; wherein in the first step, for each file of sound information, one of images based on image information associated with the file is set as a representative image of the file.

Thus, this recording and reproducing method can automatically set a representative image for each message without requiring a complicated user operation, and perform reproduction after a sound content of each message is visually and intuitively grasped in advance on the basis of the representative image.

According to the embodiments of the present invention, sound information obtained by collecting external sound is converted to files in message units and the files are recorded on a predetermined recording medium, image information obtained by photographing an outside is recorded on the recording medium in association with a corresponding file of sound information in response to a predetermined first external operation, images based on image information associated with respective files of sound information are displayed, a file of sound information associated with an image selected by a predetermined second external operation among the displayed images is reproduced, and for each file of sound information, one of images based on image information associated with the file is set as a representative image of the file.

Thus, a representative image for each message can be automatically set without requiring a complicated user operation, and reproduction can be performed after a sound content of each message is visually and intuitively grasped in advance on the basis of the representative image. Therefore ease of search can be improved.

BRIEF DESCRIPTION OF THE DRAWINGS

FIG. 5 is a block diagram showing an circuit configuration of the IC recorder with the camera according to the present embodiment;

FIG. 6 is a plan view of an outline of composition of a message folder selecting screen or the like;

DETAILED DESCRIPTION OF THE PREFERRED EMBODIMENT

One embodiment of the present invention will hereinafter be described in detail with reference to the drawings.

(1) Structure of IC Recorder 1 with Camera According to Present Embodiment

Figure 1:
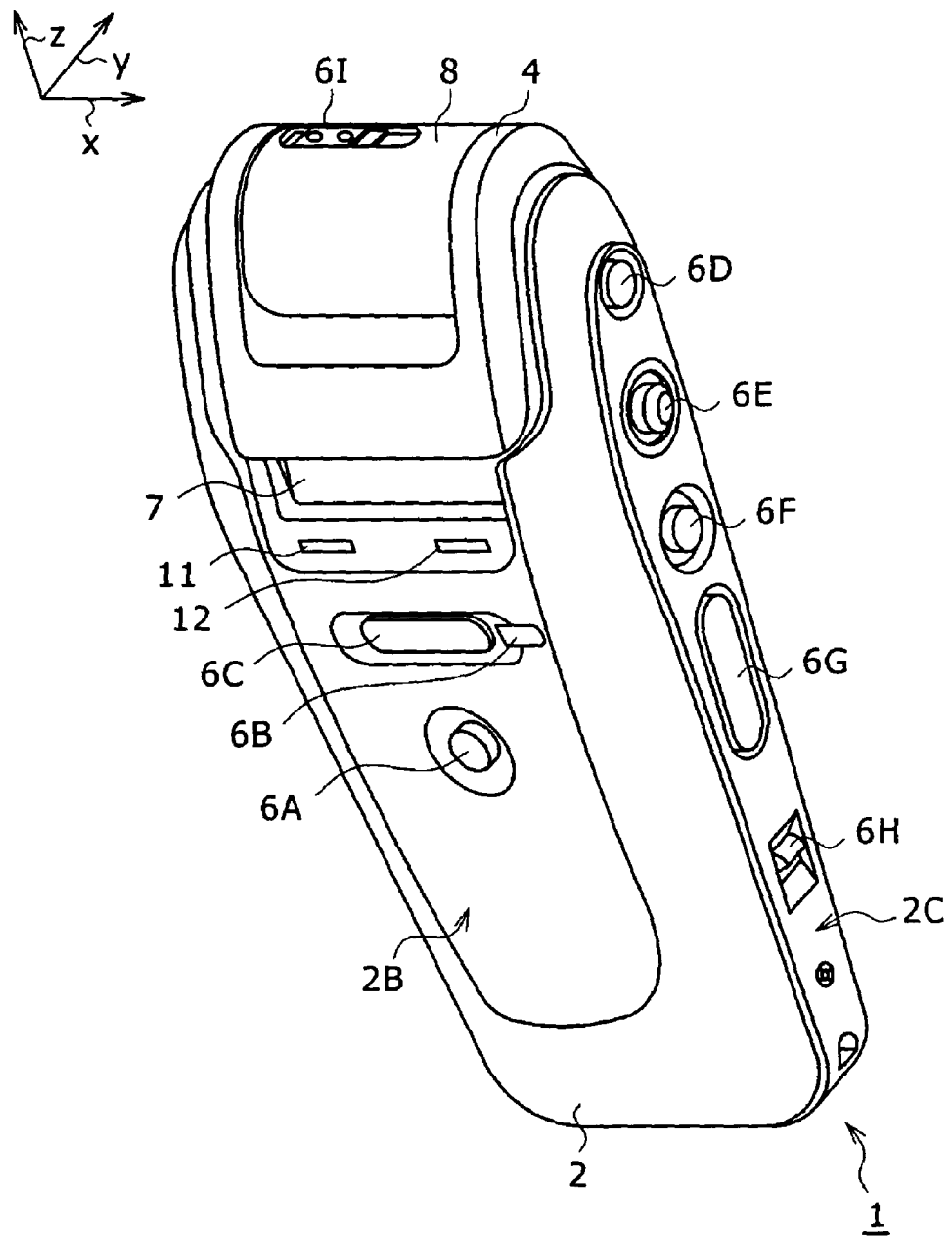
FIG. 1 is a perspective view of an external structure of an IC recorder with a camera according to a present embodiment.
Figure 2:
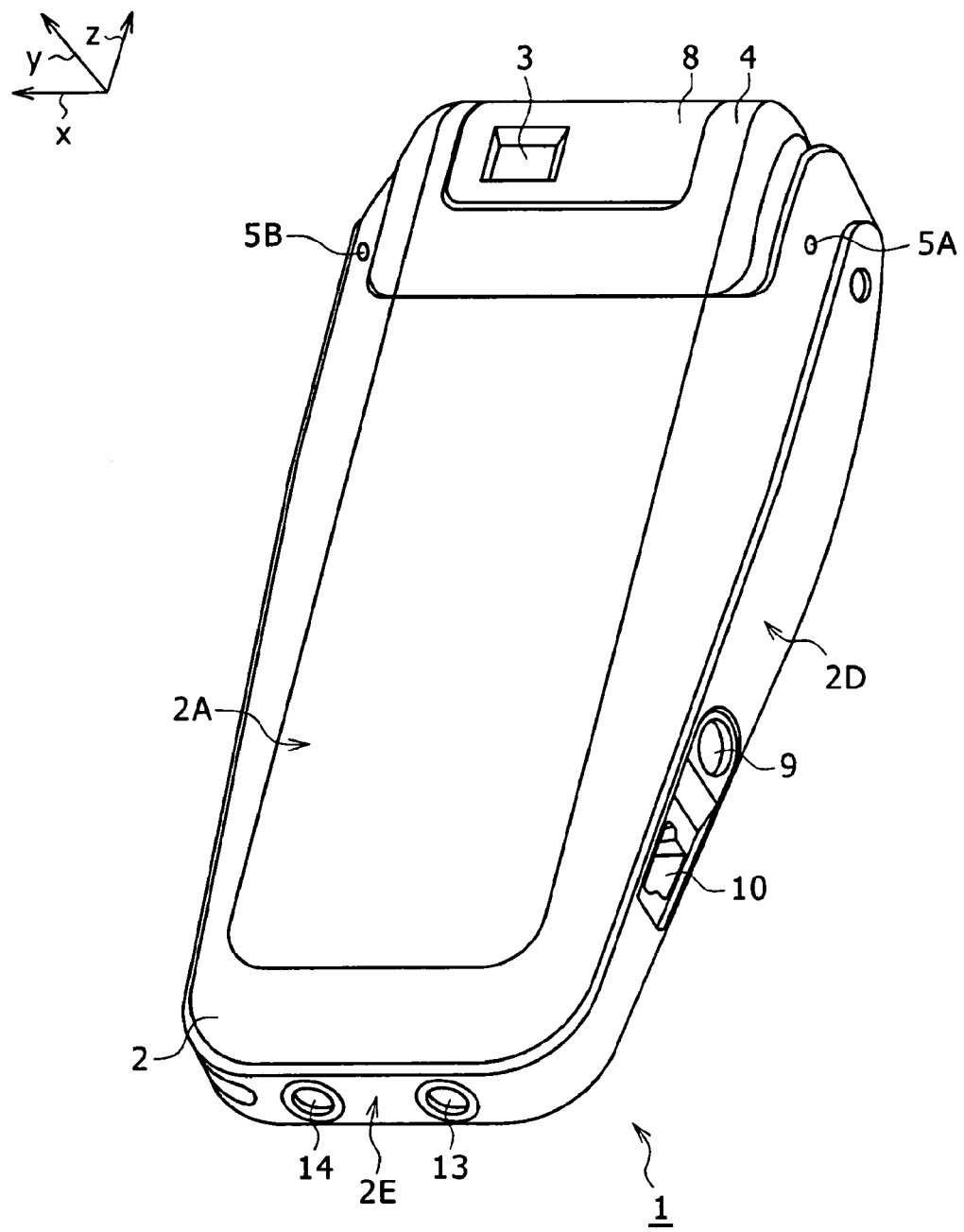
FIG. 2 is another perspective view of an external structure of the IC recorder with the camera according to the present embodiment.
Figure 3:
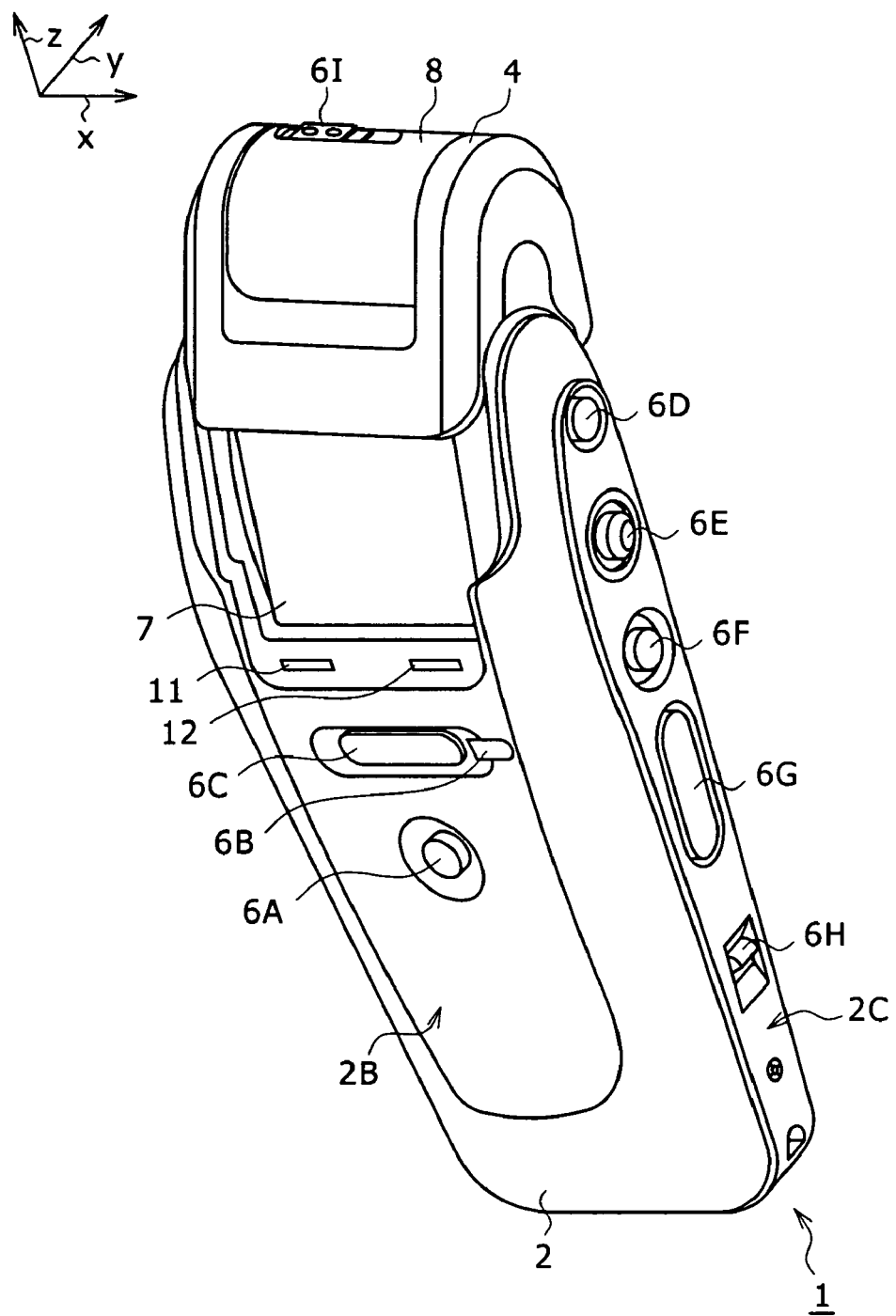
FIG. 3 is a further perspective view of an external structure of the IC recorder with the camera according to the present embodiment.

In FIGS. 1 to 3, reference numeral 1 denotes an IC recorder with a camera according to the present embodiment as a whole. An LCD cover section 4 to which a CCD (Charge Coupled Device) camera 3 is attached is disposed so as to be slidable in an upward direction (direction of an arrow z), on an upper part of a main body part 2 that is rounded as a whole and vertically long.

Sound collecting holes 5A and 5B are made on both a left side and a right side of an upper part of a back surface 2A of the main body part 2, and microphones 20A and 20B (FIG. 5) are housed within the main body part 2 in such a manner as to correspond to these sound collecting holes. Thus, these microphones 20A and 20B can collect external sound via the corresponding sound collecting holes 5A and 5B.

A recording button 6A is disposed at a middle position of a front surface 2B of the main body part 2. Pressing the recording button 6A can start an operation of recording the external sound collected by the microphones 20A and 20B.

Further, an LCD 7 formed by a high-resolution color liquid crystal display is disposed at an upper position of the front surface 2B of the main body part 2, as shown in FIG. 3. A live view button 6B is disposed below the LCD 7. By pressing the live view button 6B when the LCD cover section 4 is set in an open state by being pulled out in the upward direction as shown in FIG. 3, and a camera cover 8 of the LCD cover section 4 is set in an open state by being rotated so as to expose the CCD camera 3 as later described, a moving image taken by the CCD camera 3 at that time can be displayed on the LCD 7.

A camera shutter button 6C is disposed on a left side of the live view button 6B at the middle position of the front surface 2B of the main body part 2. By pressing the camera shutter button 6C in a state of a moving image being displayed on the LCD 7, a still image for one frame at a moment when the camera shutter button 6C is pressed can be captured from the moving image displayed on the LCD 7, and stored.

On the other hand, a menu button 6D is provided on a right side surface 2C of the main body part 2. By pressing the menu button 6D, a predetermined menu screen can be displayed on the LCD 7. In addition, a jog lever 6E is disposed under the menu button 6D on the right side surface 2C of the main body part 2. By operating the jog lever 6E such that the jog lever 6E is tilted in an upward direction, a downward direction, a left direction, or a right direction, or pressing the jog lever 6E, a desired alternative can be selected from among various alternatives displayed within a menu screen, or the alternative can be set as a selected object.

Further, a stop button 6F is disposed under the jog lever 6E on the right side surface 2C of the main body part 2, and a volume button 6G is disposed under the stop button 6F. Pressing the stop button 6F can stop recording operation or reproducing operation. Pressing an upper side or a lower side of the volume button 6G during reproducing operation can raise or lower the volume of reproduced sound output from a speaker 32 (FIG. 5) provided on the back side of the LCD 7 at this time.

Further, a voice-up switch 6H is disposed under the volume button 6G on the right side surface 2C of the main body part 2. When the voice-up switch 6H is set in an on state during reproducing operation, sound recorded at a low volume level can be output at a high volume level while the volume of sound recorded at a high volume level at the time of recording operation is maintained as it is.

On the other hand, a power supply connector 9 is disposed on a left side surface 2D of the main body part 2. By inserting a plug of a power supply kit into the power supply connector 9, power supply voltage can be supplied to the IC recorder 1 with the camera, or a battery not shown in the figure included in the IC recorder 1 with the camera can be charged.

In addition, a USB (Universal Serial Bus) connector 10 is disposed under the power supply connector 9 on the left side surface 2D of the main body part 2. The IC recorder 1 with the camera can be USB-connected to an external device such as a personal computer or the like via the USB connector 10. Thus, the IC recorder 1 with the camera can output sound data of recorded sound and image data of recorded images stored in the IC recorder 1 with the camera to the USB-connected external device, and capture sound data and image data supplied from the external device.

Incidentally, a charging LED (Light Emitting Diode) 11 illuminates at a time of charging and an operation LED 12 illuminating at a time of recording operation and at a time of reproducing operation are disposed directly below the LCD 7 on the front surface 2B of the main body part 2. Thus a user can easily detect whether charging, recording, and the like are surely performed on the basis of an on/off state of the charging LED 11 and the operation LED 12.

Further, a microphone jack 13 and a headphone jack 14 are disposed on a lower side surface 2E of the main body part 2. Thus, by inserting an output plug of an external microphone not shown in the figure into the microphone jack 13, external sound collected by the microphone can be captured and recorded. By inserting an external input plug of headphones not shown in the figure into the headphone jack 14, recorded sound reproduced at a time of reproducing operation can be listened to by the headphones.

The external shape of the LCD cover section 4 is selected so as to cover about ⅔ of the LCD 7 of the main body part 2 in a closed state as shown in FIG. 1 and FIG. 2. Thereby, the IC recorder 1 with the camera when not used can protect the LCD 7 by the LCD cover section 4 by setting the LCD cover section 4 in the closed state, whereas the IC recorder 1 with the camera when used exposes the LCD 7 to allow a user to view a menu screen or the like displayed on the LCD 7 by pulling out the LCD cover section 4 in the upward direction and thereby setting the LCD cover section 4 in the open state as shown in FIG. 3.

A camera cover 8 in a cylindrical shape is rotatably disposed in an upper part of the LCD cover section 4, and the above-described CCD camera 3 is attached to a predetermined position of the camera cover 8 such that an optical axis of the CCD camera 3 is perpendicular to a central axis of the camera cover 8.

Figure 4A:
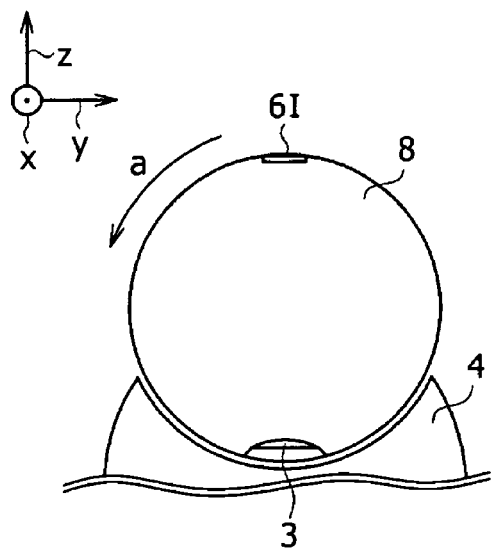
FIGS. 4A, 4B, and 4C are schematic diagrams of rotational states of a camera cover.
Figure 4B:
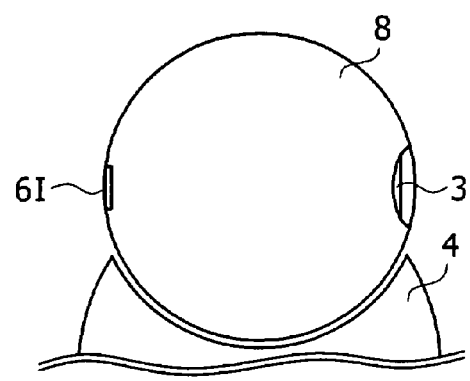
Figure 4C:
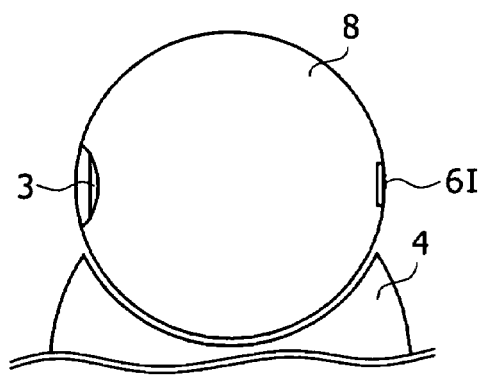

In this case, the camera cover 8 can be rotated in a direction of an arrow "a" or in an opposite direction thereto in a range from a rotation position where the CCD camera 3 is hidden within the LCD cover section 4 as shown in FIG. 4A (this rotation position will hereinafter be referred to as an origin position) to a rotation position where the optical axis of the CCD camera 3 substantially coincides with a direction of a normal to the front surface 2B of the main body part 2 as shown in FIG. 4C (this rotation position will hereinafter be referred to as an end point position).

Thereby, the IC recorder 1 with the camera protects the CCD camera 3 when not used by setting the camera cover 8 in a closed state, in which state the camera cover 8 is positioned at the origin position as shown in FIG. 4A. By changing the camera cover 8 from this state to an open state in which the CCD camera 3 is exposed on the back surface 2A side of the main body part 2 as shown in FIG. 4B by rotating the camera cover 8 in the direction of the arrow "a", a desired image can be taken while a moving image displayed on the LCD 7 is viewed. By further changing the camera cover 8 from this state by rotating the camera cover 8 to the end point position in the direction of the arrow "a", the face of a user himself/ herself can also be photographed while a moving image displayed on the LCD 7 is viewed, as shown in FIG. 4C.

Incidentally, a macro switch 6I is disposed in the camera cover 8. By setting the macro switch 6I in an on state, a macro mode that can deal with close-up photography in which the CCD camera 3 is close to a subject can be set. In this case, the macro switch 6I is selected to be disposed at a position shifted 180° from that of the CCD camera 3. Thereby, the necessity of the macro mode is determined on the basis of a moving image displayed on the LCD, and when determining that the macro mode is necessary, the user can easily set the macro switch 6I in the on state.

(2) Internal Configuration of IC Recorder 1 with Camera

FIG. 5 shows an internal configuration of the IC recorder 1 with the camera.

When power to the IC recorder 1 with the camera is turned on, the microphones 20A and 20B collect external sound, and send a resulting sound signal S1 to an AD (Analog-Digital)/DA (Digital-Analog) converter 22 via an amplifier 21. The AD/DA converter 22 sequentially subjects the sound signal S1 supplied from the microphones 20A and 20B to a digital conversion process, and sequentially sends resulting sound data D1 to a data processing and controlling unit 23.

The data processing and controlling unit 23 includes: a controlling unit 28 of a microcomputer configuration including a CPU (Central Processing Unit) 24 controlling the IC recorder 1 with the camera as a whole, a ROM (Read Only Memory) 25 storing various programs, a RAM (Random Access Memory) 26 as a work memory for the CPU 24, and a built-in timer 27; and a DSP (Digital Signal Processor) 29 having a function of compressing and decompressing the sound data D1 and image data D3 to be described later.

When one of the recording button 6A, the live view button 6B, the camera shutter button 6C, the menu button 6D, the jog lever 6E, the stop button 6F, the volume button 6G, the voice-up switch 6H, and the macro switch 6I described above that form an operating control section 6 is operated, an operating input signal S2 corresponding to the operation is supplied from the operating control section 6 to the controlling unit 28 of the data processing and controlling unit 23.

The controlling unit 28 is also supplied with an LCD cover state signal S3 indicating the closed state (FIG. 1 and FIG. 2) or the open state (FIG. 3) of the LCD cover section 4 and a camera cover state signal S4 indicating the closed state (FIG. 4A) or the open state (FIGS. 4B and 4C) of the camera cover 8 from a corresponding sensor (not shown) provided within the LCD cover section 4.

Thus, the CPU 24 in the controlling unit 28 recognizes an operation content of a user operation on the basis of the operating input signal S2, and detects present states of the LCD cover section 4 and the camera cover 8 on the basis of the LCD cover state signal S3 and the camera cover state signal S4. The CPU 24 performs corresponding various control processes on the basis of results of the recognition and the detection and various control programs stored in the ROM 25.

In practice, when recognizing that the recording button 6A of the operating control section 6 is pressed on the basis of an operating input signal S2, the CPU 24 determines the states of the LCD cover section 4 and the camera cover 8 on the basis of the LCD cover state signal S3 and the camera cover state signal S4, and when detecting that at least one of the LCD cover section 4 and the camera cover 8 is in a closed state, the CPU 24 correspondingly changes an operation mode to a sound recording mode, and controls the DSP 29. Thus, at this time, the DSP 29 under control of the CPU 24 subjects sound data D1 supplied from the AD/DA converter 22 to an audio compression process in accordance with a predetermined audio compression system such as LPEC (a registered trademark of Sony Corporation) or the like, and sequentially stores resulting compressed sound data D2 in a flash memory 30.

When thereafter recognizing that the stop button 6F is pressed on the basis of an operating input signal S2, the CPU 24 controls the DSP 29 to stop the audio compression process on the sound data D1 supplied from the AD/DA converter 22. Meanwhile, the CPU 24 creates a new message folder ("03072400" to "03072408" in FIG. 7) within a folder selected by the user at that time. The CPU 24 converts the compressed sound data D2 to a file in the same file format as an audio file format employed in an existing IC recorder. The CPU 24 stores the thus obtained sound file in the message folder. The CPU 24 stores managing information for the message folder in a managing file MSF (FIG. 8) to be described later.

When detecting that both the LCD cover section 4 and the camera cover 8 are in an open state on the basis of the LCD cover state signal S3 and the camera cover state signal S4, the CPU 24 changes the operation mode to a camera mode, and controls the CCD camera 3 to start the CCD camera 3. As a result, an image signal S5 of a scene being photographed by the CCD camera 3 at that time is sequentially output from the CCD camera 3 and supplied to the data processing and controlling unit 23.

Then, when recognizing in this state that the live view button 6B is pressed on the basis of an operating input signal S2, the CPU 24 correspondingly controls the DSP 29. Thus, the DSP 29 at this time sequentially subjects the image signal S5 supplied from the CCD camera 3 to digital conversion, and sends resulting image data D3 to the LCD 7. As a result, a moving image of the scene being photographed by the CCD camera 3 at that time which image is based on the image data D3 is displayed on the LCD 7 in real time.

Further, when thereafter recognizing in this state that the camera shutter button 6C is pressed on the basis of an operating input signal S2, the CPU 24 correspondingly controls the DSP 29. Thus, the DSP 29 at this time captures the image data D3 of a still image for one frame at a moment when the camera shutter button 6C is pressed which image is obtained on the basis of the image data D3, subjects the captured image data D3 to an image compression process in accordance with a predetermined image compression system such for example as JPEG (Joint Photographic Experts Group), and then stores resulting compressed image data D4 in the flash memory 30.

Thereafter the CPU 24 creates a new message folder within a folder selected by the user at that time. The CPU 24 stores an image file of the compressed image data D4 in the message folder. The CPU 24 stores managing information for the message folder in the managing file MSF.

On the other hand, when recognizing that the recording button 6A of the operating control section 6 is pressed on the basis of an operating input signal S2, the CPU 24 determines the states of the LCD cover section 4 and the camera cover 8 on the basis of the LCD cover state signal S3 and the camera cover state signal S4, and when detecting that both the LCD cover section 4 and the camera cover 8 are in an open state, the CPU 24 changes the operation mode to a sound recording and image recording mode, and correspondingly controls the DSP 29.

At this time, as in the above-described sound recording mode, the DSP 29 sequentially subjects sound data D1 supplied from the AD/DA converter 22 to the predetermined audio compression process, and then stores resulting compressed sound data D2 in the flash memory 30. Also, as in the above-described camera mode, the DSP 29 at this time sequentially subjects an image signal S5 supplied from the CCD camera 3 to digital conversion, and sends resulting image data D3 to the LCD 7. As a result, a moving image of a scene being photographed by the CCD camera 3 at that time which image is based on the image data D3 is displayed on the LCD 7 in real time.

Further, when thereafter recognizing in this state that the camera shutter button 6C is pressed on the basis of an operating input signal S2, the CPU 24 correspondingly controls the DSP 29. As in the camera mode, the DSP 29 at this time captures the image data D3 of a still image for one frame at a moment when the camera shutter button 6C is pressed which image is obtained on the basis of the image signal S5 supplied from the CCD camera 3, and subjects the captured image data D3 to an image compression process.

The DSP 29 then stores compressed image data D4 obtained by such an image compression process in the flash memory 30 as compressed image data D4 of an image to serve as a mark for later search for the moment when the camera shutter button 6C is pressed (this image will hereinafter be referred to as a bookmark image) such that the compressed image data D4 is associated with a corresponding position of the compressed sound data D2 being sequentially stored in the flash memory 30 at that time.

When thereafter recognizing that the stop button 6F is pressed on the basis of an operating input signal S2, the CPU 24 creates a new message folder within a folder selected by the user at that time. The CPU 24 stores a sound file of the compressed sound data D2 and image files of compressed image data D4 as described above associated with the sound file in the message folder. The CPU 24 stores managing information for the message folder in the managing file MSF.

Thus, the IC recorder 1 with the camera can not only record sound and still images independently of each other but also record still images as bookmark images in association with sound being recorded.

The IC recorder 1 with the camera enables a search for a desired message folder on the basis of a bookmark image thus recorded in association with sound.

Figure 6:
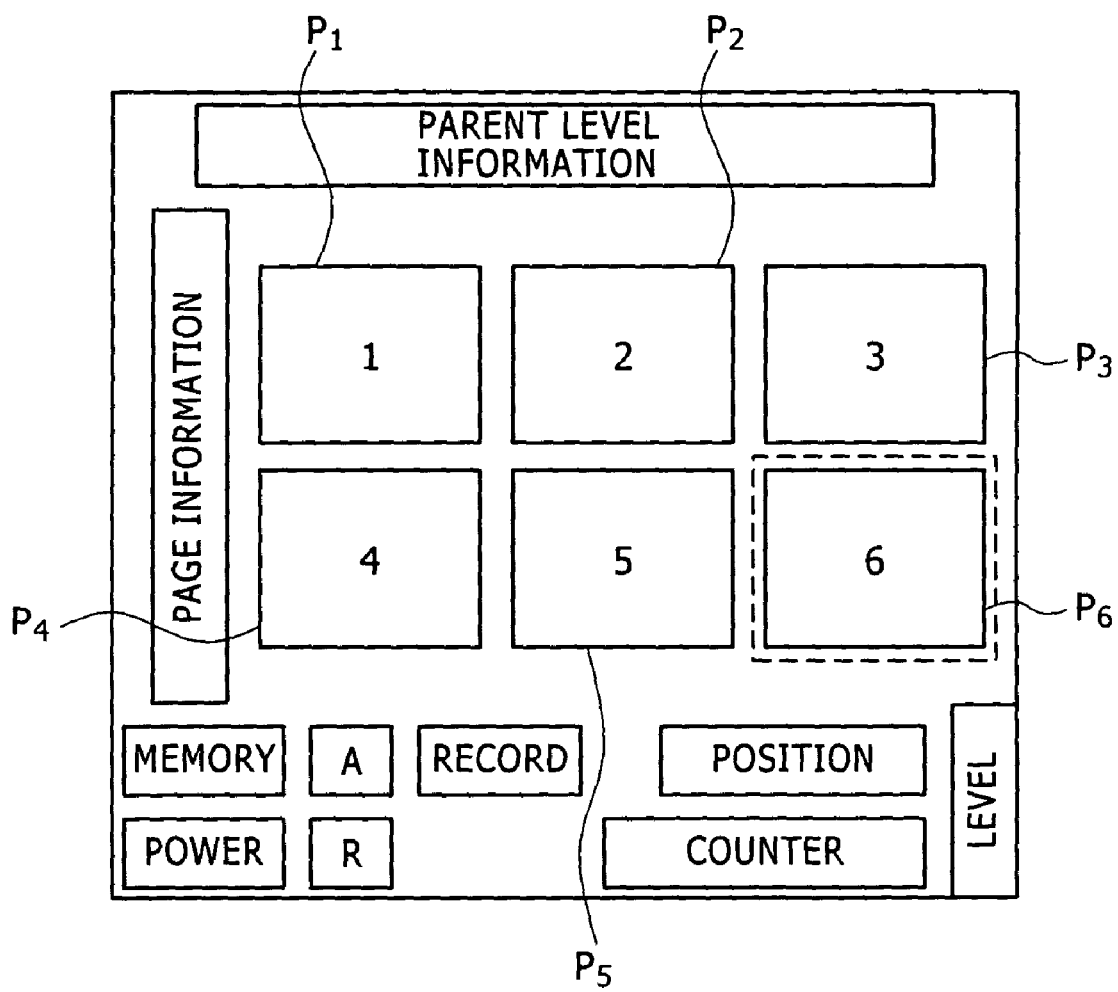

In practice, when the jog lever 6E is pressed and the CPU 24 recognizes on the basis of an operating input signal S2 that a command to display a screen for reproducing a desired message folder within a desired folder (this screen will hereinafter be referred to as a message folder selecting screen) or a selecting screen for selecting a desired bookmark image within that message folder (this screen will hereinafter be referred to as a bookmark image selecting screen), the CPU 24 reads corresponding image data D3 from the ROM 25, and then sends the image data D3 to the LCD 7 to thereby display a message folder selecting screen 33 as shown in FIG. 6 or a bookmark image selecting screen 34 (FIG. 6) having a similar composition to that of the message folder selecting screen 33 on the LCD 7.

In this case, to display the message folder selecting screen 33 on the LCD 7, the CPU 24 reads, from the flash memory 30, an image file (compressed image data D4) of a representative bookmark image (hereinafter referred to as a representative image) set in advance for each message folder within the folder, makes the DSP 29 decode the compressed image data D4, and creates thumbnail images $P_1$ to $P_6$ of a predetermined size on the basis of resulting image data D3.

Then, as shown in FIG. 6, the CPU 24 displays a list of the thus obtained thumbnail images $P_1$ to $P_6$ for the respective message folders within the message folder selecting screen 33. Incidentally, for a message folder including only sound and including no still image, a predetermined icon is displayed instead of a thumbnail image.

When the jog lever 6E is thereafter operated in an upward direction, a downward direction, a left direction, or a right direction to move a cursor displayed together with the thumbnail images $P_1$ to $P_6$ within the message folder selecting screen 33 so as to indicate and select a desired thumbnail image P, and then the jog lever 6E is pressed to set the thumbnail image P at this time as a selected object, the CPU 24 reads a sound file (compressed sound data D2) within a corresponding message folder from the flash memory 30 on the basis of a message managing file, and makes the DSP 29 decode the compressed sound data D2.

As a result, sound data D1 obtained by such a decoding process is output from the DSP 29 to be subjected to analog conversion in the AD/DA converter 22. A resulting sound signal S6 is supplied to the speaker 32 via an amplifier 31. Thereby, at this time, sound based on the sound signal S6 is output from the speaker 32.

Similarly, to display the bookmark image selecting screen 34 (FIG. 6) on the LCD 7, the CPU 24 reads, from the flash memory 30, image files (pieces of compressed image data D4) of respective bookmark images within a corresponding message folder on the basis of the message managing file, makes the DSP 29 decode the pieces of compressed image data D4, and creates thumbnail images $P_1$ to $P_6$ of a predetermined size on the basis of pieces of resulting image data D3. Then, the CPU 24 displays a list of the thus obtained thumbnail images $P_1$ to $P_6$ for the respective bookmark images within the bookmark image selecting screen 34.

When the jog lever 6E is thereafter operated to select one of the thumbnail images $P_1$ to $P_6$ within the bookmark image selecting screen 34, the CPU 24 reads, from the flash memory 30, compressed sound data D2 after a sound part associated with the original bookmark image of the thumbnail image $P_1$ to $P_6$ in a corresponding sound file, and then makes the DSP 29 decode the compressed sound data D2.

As a result, sound data D1 obtained by such a decoding process is output from the DSP 29 to be subjected to analog conversion in the AD/DA converter 22. A resulting sound signal S6 is supplied to the speaker 32 via the amplifier 31. Thereby, based on the sound signal S6, sound after the sound position corresponding to the bookmark image selected by the user in the selected message folder is output from the speaker 32.

Thus, the IC recorder 1 with the camera makes it possible to quickly and easily access a desired message folder or a desired sound position in the message folder on the basis of the representative image of the message folder or each bookmark image within the message folder.

In addition to such a configuration, the IC recorder 1 with the camera allows a new bookmark image to be recorded in a message folder including a sound file at a time of reproducing the sound file, and allows sound to be recorded later in a message folder including only an image file in association with the image file.

In practice, when recognizing that the camera shutter button 6C is pressed on the basis of an operating input signal S2 in a state in which the CPU 24 detects that both the LCD cover section 4 and the camera cover 8 are open on the basis of the LCD cover state signal S3 and the camera cover state signal S4 and a sound file of a message folder selected by the user is reproduced as described above, the CPU 24 correspondingly controls the DSP 29.

Under control of the CPU 24, the DSP 29 at this time captures image data D3 of a still image for one frame at a moment when the camera shutter button 6C is pressed which image is obtained on the basis of an image signal S5 supplied from the CCD camera 3, and subjects the captured image data D3 to an image compression process. The DSP 29 then stores compressed image data D4 obtained by such an image compression process in the flash memory 30 as an image file of a bookmark image at the moment when the camera shutter button 6C is pressed such that the compressed image data D4 is associated with the sound file being reproduced at that time.

On the other hand, when recognizing that the recording button 6A is pressed on the basis of an operating input signal S2 after a message folder including only an image file is selected on the message folder selecting screen 33 (FIG. 6) displayed on the LCD 7 and a command for additional recording in the message folder is input by a predetermined operation using the jog lever 6E, the CPU 24 correspondingly controls the DSP 29.

Thus, under control of the CPU 24, the DSP 29 at this time subjects sound data D1 supplied from the AD/DA converter 22 to an audio compression process, and then stores resulting compressed sound data D2 as a sound file in association with the image file in the flash memory 30. Incidentally, in this case, a still image based on the original image file is automatically set as a bookmark image at a start position of the additionally recorded sound.

Thus the IC recorder 1 with the camera allows a bookmark image to be additionally recorded later freely at a desired position of recorded sound, and allows sound to be additionally recorded later in association with a recorded still image. It is thereby possible to improve ease of search for a desired position of recorded sound and improve functionality of the IC recorder.

(3) Directory Structure of Data Managing Format in IC Recorder with Camera

Description will next be made of a directory structure of a Voiscape Format as a data managing format for compressed sound data D2 and compressed image data D4, which format is employed in the IC recorder 1 with the camera.

Figure 7:
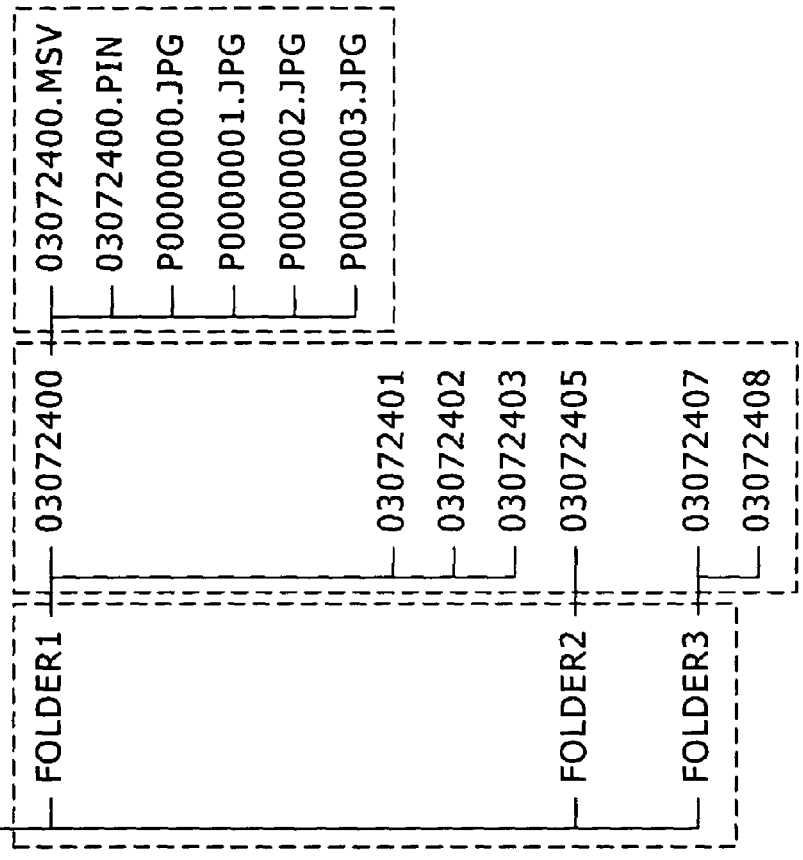
FIG. 7 is a schematic diagram showing a data structure of the IC recorder with the camera.

FIG. 7 shows the directory structure of the Voiscape Format. As shown in FIG. 7, a sound file ("03072400.MSV") of recorded sound and image files ("P0000000.JPG" to "P0000003.JPG") of bookmark images recorded in association with the sound file are stored in a folder referred to as "VOISCAPE" created within a folder referred to as "MSSONY."

Folders ("FOLDER1" to "FOLDER3") including message folders are present within this "VOISCAPE." The user can select a desired folder as a position where a sound file of recorded sound and the like are stored from among these folders.

Figure 8:
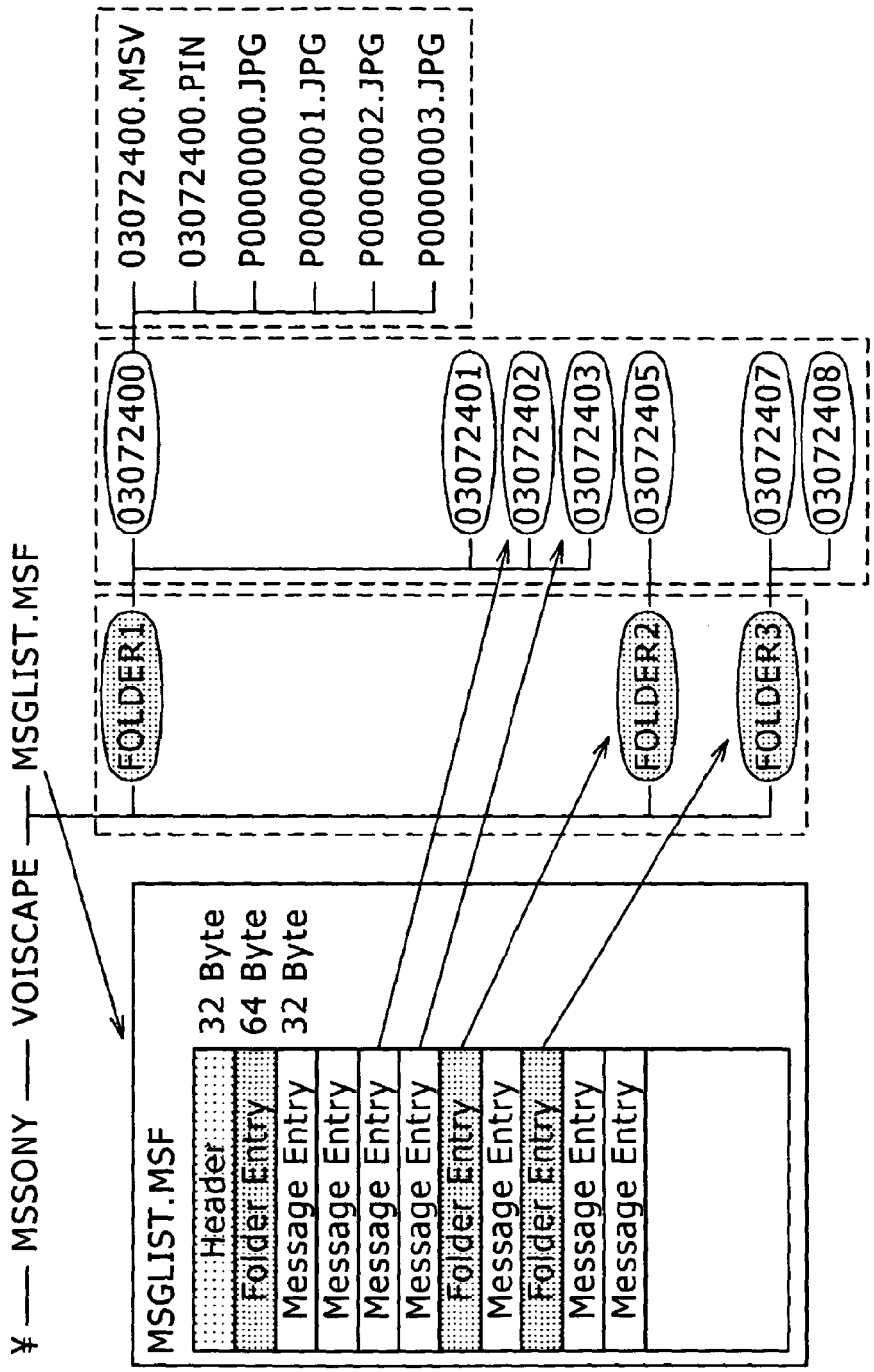
FIG. 8 is a schematic diagram showing a data structure of a message folder managing file.

The "VOISCAPE" also stores the above-described message managing file ("MSGLIST.MSF") for managing the created message folders. As shown in FIG. 8, this message managing file has a data structure in which following a header ("Header") of 32 [Bytes], information ("Folder Entry") on the folder names and the like of respective folders ("FOLDER1" to "FOLDER3") and information ("Message Entry") on the folder names and the like of respective message folders created within the folders are sequentially described for each folder. It is thereby possible to search for a desired message folder in a folder on the basis of the message managing file.

Further, message folders ("03072400" to "03072408") are created in each folder ("FOLDER1" to "FOLDER3") according to conditions of use by the user. Each of the message folders includes a sound file ("03072400.MSV") obtained by sound recording, an image file ("P0000000.JPG" to "P0000003.JPG") of each bookmark image, and an image managing file ("03072400.PIN").

Figure 9:
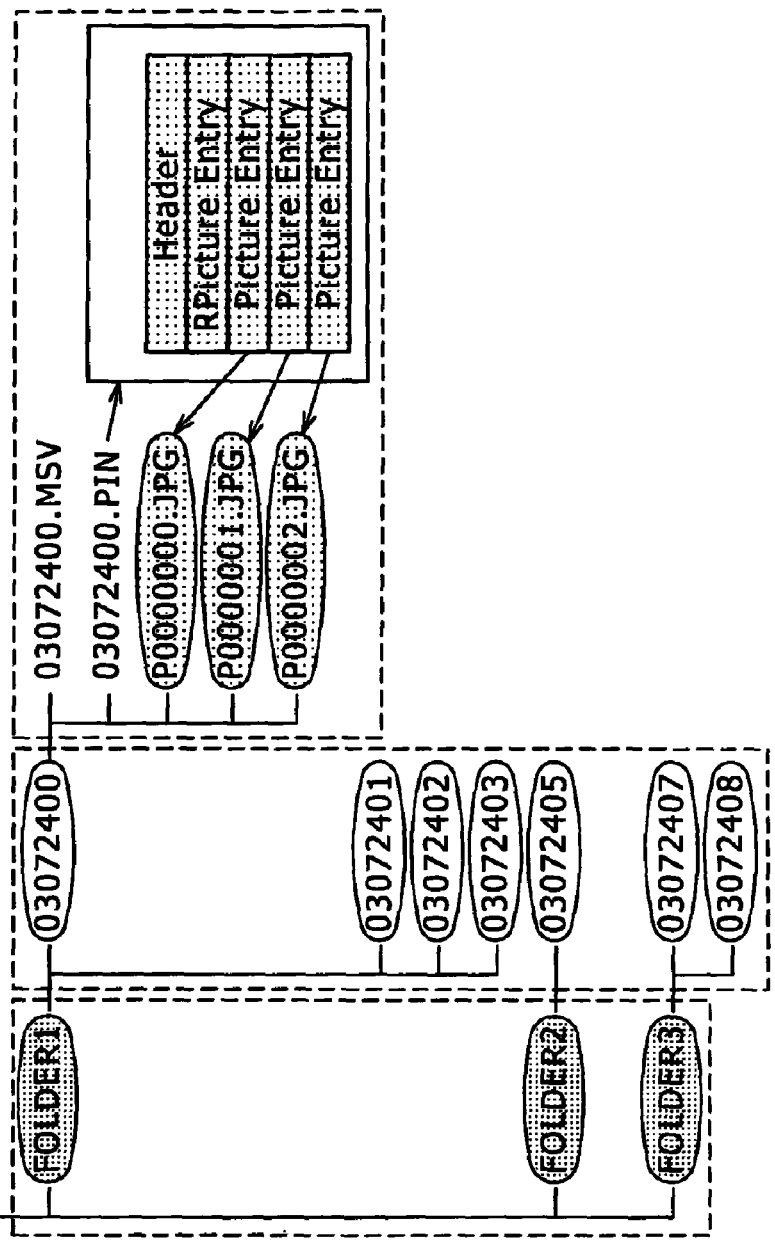
FIG. 9 is a schematic diagram showing a data structure of an image managing file.

The image managing file is to manage each image file. As shown in FIG. 9, the image managing file has a data structure in which following a header ("Header"), when a representative image is set, a file name (RPicture Entry) of an image file of the representative image is described, and following the file name (RPicture Entry), a file name of an image file of each bookmark image and a bind position (time) of the bookmark image with respect to sound are described. Thereby, on the basis of the image managing file, search can be made for the representative image of the message folder or a bind position of each bookmark image (a position in related sound with which position the bookmark image is associated).

Incidentally, by thus storing a sound file and an image file of each bookmark image associated with the sound file within a same folder (message folder), relation between the sound file and the image file is easily recognized when these pieces of data are captured into an external personal computer and viewed by Explorer. It is thus possible to prevent the user from accidentally deleting the sound file or the image file.

(4) Representative Image Automatic Setting Process

Description will next be made of a representative image automatic setting process included in the IC recorder 1 with the camera.

The CPU 24 in the IC recorder 1 with the camera automatically sets a representative image in association with a sound at a sound recording start time point in a sound recording and image recording mode.

In practice, when the CPU 24 detects that both the LCD cover section 4 and the camera cover 8 are in an open state when the CPU 24 recognizes that the recording button 6A is pressed, the CPU 24 measures an elapsed time from the sound recording start time point (a point in time when the recording button 6A is pressed) by the timer 27.

At this time, the CPU 24 changes an operation mode to a sound recording and image recording mode, and controls the DSP 29 to sequentially store sound data D1 supplied from the AD/DA converter 22 as compressed sound data D2 in the flash memory 30, while sequentially sending an image signal S5 supplied from the CCD camera 3 as image data D3 to the LCD 7, so that a moving image of a scene being photographed by the CCD camera 3 at that time is displayed on the LCD 7 in real time.

When recognizing in this state that the camera shutter button 6C is pressed, the CPU 24 generates the image data D3 of a still image for one frame at a moment when the camera shutter button 6C is pressed as compressed image data D4, and generates an image managing file (FIG. 9: ("03072400.PIN")).

When conditions that a point in time of the moment when the camera shutter button 6C is pressed is within 30 [seconds] of the sound recording start time point and that no representative image is set are met, the CPU 24 sets the image of the compressed image data D4 generated at this time as a representative image and stores the set compressed image data D4 in the flash memory 30, and describes a file name of the compressed image data D4 and a sound start time (the time when the recording button 6A is pressed) in a representative image description area (FIG. 9: ("RPicture Entry")) following the header (FIG. 9: ("Header")) in the image managing file.

On the other hand, when such conditions are not met, the CPU 24 sets the image of the compressed image data D4 generated at this time as a bookmark image and stores the set compressed image data D4 in the flash memory 30, and sequentially describes a file name of the compressed image data D4 and the time when the camera shutter button 6C is pressed in a bookmark image area (FIG. 9: ("Picture Entry")) in the image managing file (FIG. 9: ("03072400.PIN")).

When thereafter recognizing that the stop button 6F is pressed, the CPU 24 creates a new message folder (FIG. 9: ("FOLDER")) within a folder selected by the user at that time. The CPU 24 stores a sound file (FIG. 9: ("03072400.MSV")) formed of the compressed sound data D2, each image file (FIG. 9: ("P0000000.JPG")) associated with the sound file, and the image managing file (FIG. 9: ("03072400.PIN")) in the message folder. The CPU 24 stores managing information for the message folder in the message managing file.

Thus, the CPU 24 sets a still image corresponding to a first operation of pressing the camera shutter button 6C within 30 [seconds] of a start of sound recording as a representative image associated with a sound at the sound recording start time point, and sets a still image corresponding to an operation of pressing the camera shutter button 6C after passage of the 30 [seconds] as a bookmark image associated with a sound at a time of the pressing operation regardless of whether the pressing operation is a first operation or not.

Incidentally, when the camera shutter button 6C is pressed for a first time after the passage of 30 [seconds] from a start of sound recording, or when the stop button 6F is pressed with the camera shutter button 6C having never been pressed, the CPU 24 includes icon data stored in advance in the ROM 25 in a message folder as an image file, sets an icon based on the icon data as a representative image in association with a sound at the sound recording start time point, and describes the set content in the representative image description area of an image managing file.

Figure 10:
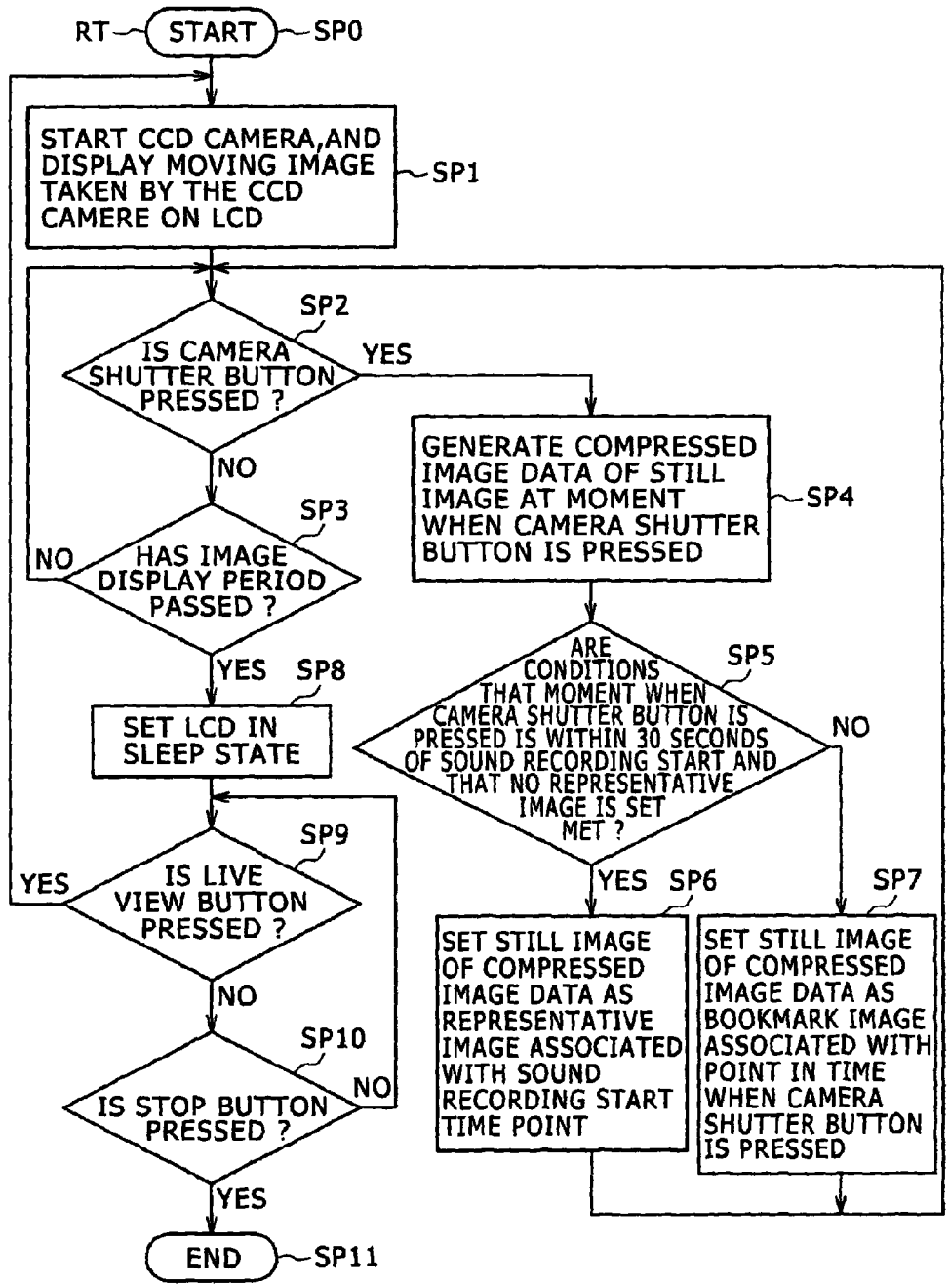
FIG. 10 is a flowchart of a representative image automatic setting process procedure.

The above-described process of representative image automatic setting by the CPU 24 is performed according to a representative image automatic setting process procedure RT shown in FIG. 10.

Specifically, when the CPU 24 detects that both the LCD cover section 4 and the camera cover 8 are in an open state when the CPU 24 recognizes that the recording button 6A is pressed, the CPU 24 starts the representative image automatic setting process procedure RT in step SP0. In next step SP1, the CPU 24 measures an elapsed time from the sound recording start time point by the timer 27, and starts the CCD camera 3 and displays a moving image being taken by the CCD camera 3 on the LCD 7 in real time.

In next step SP2, the CPU 24 determines whether the camera shutter button 6C is pressed. When a negative result is obtained in step SP2, the CPU 24 proceeds to step SP3 to determine whether a predetermined image display period has elapsed from the start of the CCD camera 3. When a negative result is obtained also in step SP3, the CPU 24 returns to step SP2 to wait for an operation of pressing the camera shutter button 6C within the image display period.

When the CPU 24 determines in step SP2 that the camera shutter button 6C is pressed, the CPU 24 proceeds to step SP4 to generate an image signal S5 corresponding to a moment when the camera shutter button 6C is pressed as compressed image data D4. In next step SP5, the CPU 24 determines whether conditions that the moment when the camera shutter button 6C is pressed is within 30 [seconds] of the sound recording start and that no representative image is set are met.

When the conditions are met, the CPU 24 proceeds to step SP6 to set a still image of the compressed image data D4 generated in step SP4 as a representative image in association with a sound at the sound start time point (the point in time when the recording button 6A is pressed). The CPU 24 thereafter returns to step SP2 and repeats the above-described process. On the other hand, when the conditions are not met, the CPU 24 proceeds to step SP7 to set the still image of the compressed image data D4 generated in step SP4 as a bookmark image in association with a sound at the point in time when the camera shutter button 6C is pressed. The CPU 24 thereafter returns to step SP2 and repeats the above-described process.

When the CPU 24 determines in step SP3 that the image display period has elapsed, on the other hand, the CPU 24 proceeds to step SP8 to stop the display of the LCD 7.

Then, the CPU 24 determines in next step SP9 whether the live view button 6B is pressed. When a negative result is obtained in step SP9, the CPU 24 proceeds to step SP10 to determine whether the stop button GF is pressed. When a negative result is obtained also in step SP10, the CPU 24 returns to step SP9 to wait for an operation of pressing the live view button 6B or the stop button 6F.

When the CPU 24 determines in step SP9 that the live view button 6B is pressed, the CPU 24 terminates a display stop state of the LCD 7, and then returns to step SP1 to repeat the above-described process. On the other hand, when the CPU 24 determines in step SP10 that the stop button 6F is pressed, the CPU 24 proceeds to step SP11 to end the representative image automatic setting process procedure RT.

Thus, the CPU 24 can automatically set a representative image in association with a sound at a sound recording start time point.

(5) Operation and Effect

In the above constitution, the IC recorder 1 with the camera sequentially associates the compressed image data D4 of an image at a moment when the camera shutter button 6C is pressed which image is obtained from a moving image being taken by the CCD camera with compressed sound data D2 of sound recorded at that time, and stores the compressed image data D4 in a message folder unit in the flash memory 30.

Then, the IC recorder 1 with the camera displays such images in message units as a message folder selecting screen 33 on the LCD 7. The IC recorder 1 with the camera reproduces compressed sound data D2 associated with the compressed image data D4 of an image selected from the message folder selecting screen 33.

The IC recorder 1 with the camera therefore makes it possible to perform reproduction after visually and intuitively grasping sound contents in message units in advance on the basis of images.

In this case, the IC recorder 1 with the camera sets an image at a moment when the camera shutter button 6C is pressed for a first time in a period of a predetermined extension time (30 [seconds] in this embodiment) from a sound recording start time point as an image (representative image) in a message unit to be displayed on the message folder selecting screen 33 in association with a sound at the sound recording start time point.

Thus, by merely pressing the camera shutter button 6C within the predetermined extension time from a sound recording start time point, the IC recorder 1 with the camera can automatically set a representative image for each message. It is thus possible to set a representative image without setting a representative image later or without pressing the camera shutter button 6C in haste after a sound recording start time point, so that operability can be improved. In addition, since an image in an extension time from a sound recording start time point, which image is considered to generally make a deep impression, is set as a representative image, a sound content of each message can be grasped more intuitively, and since the image is associated with a sound at the sound recording start time point, a message start point search and reproduction desired by a user can be easily performed.

Further, when the camera shutter button 6C is pressed for a first time during a period other than the predetermined extension time from a sound recording start time point, or when the camera shutter button 6C is not pressed before a sound recording end time point, an icon prepared in advance is set as a representative image in association with a sound at the sound recording start time point.

Thus the IC recorder 1 with the camera can easily and surely perform a message start point search and reproduction desired by a user.

According to the above constitution, compressed image data D4 of an image at a moment when the camera shutter button 6C is pressed is sequentially associated with compressed sound data D2 of sound recorded at that time, and stored in a message folder unit in the flash memory 30. Then, such representative images in message units are displayed as a message folder selecting screen 33 on the LCD 7. The compressed sound data D2 associated with the compressed image data D4 of a representative image selected from the message folder selecting screen 33 is reproduced. Also, an image at a moment when the camera shutter button 6C is pressed for a first time in a period of a predetermined extension time from a sound recording start time point is set as the representative image in association with a sound at the sound recording start time point. Thus, a representative image for each message is set automatically without requiring a complicated user operation, and a sound content of each message can be grasped visually and intuitively on the basis of representative images. It is thus possible to improve ease of search.

(6) Other Embodiments

While in the foregoing embodiment, description has been made of a case where the flash memory 30 incorporated in the IC recorder 1 with the camera is applied as a recording medium for recording sound information and image information, the present invention is not limited to this. A flash memory detachable from the IC recorder 1 with the camera may be applied, and in place of the flash memory, various other recording media such for example as a Memory Stick (Registered Trademark of Sony Corporation) may be applied.

In the foregoing embodiment, description has been made of a case where recording medium for setting, for each file of sound information, one of images based on image information associated with the file as a representative image of the file sets an image at a moment when the camera shutter button 6C is pressed for a first time in a period of a predetermined extension time from a sound recording start time point as a representative image in association with a sound at the sound recording start time point. However, the present invention is not limited to this. For example, an image at a moment when the camera shutter button 6C is pressed in a period from a time point preceding a sound recording end time point by a predetermined extension time to the end time point may be set as a representative image in association with a sound at the sound recording start time point. In this case, while the extension time is 30 [seconds] in the foregoing embodiment, a time such as one [minute], that is, a time such that a user will not find it strange that a still image at a point in time that the camera shutter button 6C is pressed is associated with a sound recording start time point may be used.

Further, for example, instead of an image at a moment when the camera shutter button 6C is pressed for a first time in a period of a predetermined extension time from a sound recording start time point, simply an image at a moment when the camera shutter button 6C is pressed for a first time or an image at a moment when the camera shutter button 6C is pressed for a last time may be set as a representative image in association with a sound at the sound recording start time point. In such a case, since generally a user often attaches importance to or has a deep impression of the image corresponding to the first time or the last time, a sound content of each message can be grasped visually and intuitively as in the foregoing embodiment.

Further, for example, when the camera shutter button 6C is pressed a predetermined number of times or more in a unit time, one of images at moments when the camera shutter button 6C is pressed may be set as a representative image in association with a sound at a sound recording start time point. In such a case, since generally a user often attaches importance to these images, a sound content as a whole can be grasped visually and intuitively as in the foregoing embodiment on the basis of an image for each message unit.

The present invention is applicable when sound and images are recorded and reproduced as data.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and reproducing device comprising:
   sound collecting means for collecting and outputting sound information corresponding to a result of sound collection;
   photographing means for photographing and outputting still image information corresponding to a result of photographing;
   recording means for converting said sound information to files in message units and recording the files on a predetermined recording medium, and recording said still image information on the recording medium in association with a corresponding file of said sound information in response to a predetermined first external operation;
   display means for displaying images based on said still image information associated with respective said files of said sound information; and
   reproducing means for reproducing a file of said sound information associated with an image selected from among said images displayed by said display means by a predetermined second external operation,
   wherein said recording means sets, for each said file of said sound information, one of said images based on said still image information associated with said file as a representative image of said file, said recording means sets, as said representative image of said file, an image based on said still image information associated with said file in a period of a predetermined extension time from a sound recording start time point, the period of the predetermined extension of time being substantially 30 seconds.

2. The recording and reproducing device as claimed in claim 1, wherein said first external operation is an operation of pressing a camera shutter button.

3. The recording and reproducing device as claimed in claim 1, wherein said second external operation is an operation of moving a cursor displayed together with said images by said display means so that the cursor indicates a desired image by operating a predetermined operating element, and then setting said image as a selected object by operating said operating element.

4. A recording and reproducing device comprising:
sound collecting means for collecting and outputting sound information corresponding to a result of sound collection;
photographing means for photographing and outputting still image information corresponding to a result of photographing;
recording means for converting said sound information to files in message units and recording the files on a predetermined recording medium, and recording said still image information on the recording medium in association with a corresponding file of said sound information in response to a predetermined first external operation;
display means for displaying images based on said still image information associated with respective said files of said sound information; and
reproducing means for reproducing a file of said sound information associated with an image selected from among said images displayed by said display means by a predetermined second external operation,
wherein said recording means sets, for each said file of said sound information, one of said images based on said still image information associated with said file as a representative image of said file, said recording means sets, as said representative image of said file, an image based on said still image information associated with said file in a period of a predetermined extension time from a sound recording start time point, the period of the predetermined extension of time being greater than zero, and said recording means sets, as said representative image of said file, a first image, based on said still image information, associated with a start of said file corresponding to said sound information.

5. A recording and reproducing device comprising:
sound collecting means for collecting and outputting sound information corresponding to a result of sound collection;
photographing means for photographing and outputting still image information corresponding to a result of photographing;
recording means for converting said sound information to files in message units and recording the files on a predetermined recording medium, and recording said still image information on the recording medium in association with a corresponding file of said sound information in response to a predetermined first external operation;
display means for displaying images based on said still image information associated with respective said files of said sound information; and
reproducing means for reproducing a file of said sound information associated with an image selected from among said images displayed by said display means by a predetermined second external operation,
wherein said recording means sets, for each said file of said sound information, one of said images based on said still image information associated with said file as a representative image of said file, said recording means sets, as said representative image of said file, an image based on said still image information associated with said file in a period of a predetermined extension time from a sound recording start time point, the period of the predetermined extension of time being greater than zero, and when said still image information to be associated with said file is absent, said recording means sets a predetermined image as said representative image in association with a start of said sound information.

6. A recording and reproducing method comprising:
converting sound information obtained by collecting external sound to files in message units and recording the files on a predetermined recording medium;
recording still image information obtained by photographing an outside on said recording medium in association with a corresponding file of said sound information in response to a predetermined first external operation;
displaying images, based on said still image information, associated with respective said files of said sound information; and
reproducing said file of said sound information associated with an image selected, by a predetermined second external operation, from among the displayed said images; and
setting, for each said file of said sound information, one of said images based on said still image information associated with said file as a representative image of said file, said setting includes setting, as said representative image of said file, an image based on said still image information associated with said file in a period of a predetermined extension time from a sound recording start time point, the period of the predetermined extension of time being substantially 30 seconds.

7. The recording and reproducing method as claimed in claim 6, wherein said first external operation includes pressing a camera shutter button.

8. The recording and reproducing method as claimed in claim 6, wherein said second external operation includes moving a cursor displayed together with said images by said display means so that the cursor indicates a desired image by operating a predetermined operating element, and then setting said image as a selected object by operating said operating element.

9. A recording and reproducing method comprising:
converting sound information obtained by collecting external sound to files in message units and recording the files on a predetermined recording medium;
recording still image information obtained by photographing an outside on said recording medium in association with a corresponding file of said sound information in response to a predetermined first external operation;
displaying images, based on said still image information, associated with respective said files of said sound information; and
reproducing said file of said sound information associated with an image selected, by a predetermined second external operation, from among the displayed said images; and
setting, for each said file of said sound information, one of said images based on said still image information associated with said file as a representative image of said file, said setting includes setting, as said representative image of said file, an image based on said still image information associated with said file in a period of a predetermined extension time from a sound recording start time point, the period of the predetermined extension of time being greater than zero, said setting includes setting a first image, based on said still image information, associated with a start of said file corresponding to said sound information as said representative image.

10. A recording and reproducing method comprising:
converting sound information obtained by collecting external sound to files in message units and recording the files on a predetermined recording medium;

recording still image information obtained by photographing an outside on said recording medium in association with a corresponding file of said sound information in response to a predetermined first external operation;

displaying images, based on said still image information, associated with respective said files of said sound information; and reproducing said file of said sound information associated with an image selected, by a predetermined second external operation, from among the displayed said images; and setting, for each said file of said sound information, one of said images based on said still image information associated with said file as a representative image of said file, said setting includes setting, as said representative image of said file, an image based on said still image information associated with said file in a period of a predetermined extension time from a sound recording start time point, the period of the predetermined extension of time being greater than zero, and when said still image information to be associated with said file corresponding to said sound information is absent, said setting includes setting a predetermined image as said representative image.

11. A recording and reproducing device comprising:

a sound collector collecting and outputting sound information corresponding to a result of sound collection;

a photographing device photographing and outputting still image information corresponding to a result of photographing;

a recorder converting said sound information to files in message units and recording the files on a predetermined recording medium, and recording said still image information on the recording medium in association with a corresponding file of said sound information in response to a predetermined first external operation;

a display device displaying images based on said still image information associated with respective said files of said sound information; and a reproducer reproducing said file of said sound information associated with an image selected, by a predetermined second external operation, from among said images displayed by said display device, wherein said recorder sets, for each said file of said sound information, one of said images based on said still image information associated with said file as a representative image of said file, said recorder sets, as said representative image of said file, an image based on said still image information associated with said file in a period of a predetermined extension time from a sound recording start time point, the period of the predetermined extension of time being substantially 30 seconds.

12. A recording and reproducing device comprising:

a sound collector collecting and outputting sound information corresponding to a result of sound collection;

a photographing device photographing and outputting still image information corresponding to a result of photographing;

a recorder converting said sound information to files in message units and recording the files on a predetermined recording medium, and recording said still image information on the recording medium in association with a corresponding file of said sound information in response to a predetermined first external operation;

a display device displaying images based on said still image information associated with respective said files of said sound information; and a reproducer reproducing said file of said sound information associated with an image selected, by a predetermined second external operation, from among said images displayed by said display device, wherein said recorder sets, for each said file of said sound information, one of said images based on said still image information associated with said file as a representative image of said file, said recorder sets, as said representative image of said file, an image based on said still image information associated with said file in a period of a predetermined extension time from a sound recording start time point, the period of the predetermined extension of time being greater than zero, and said recorder sets, as said representative image of said file, a first or a last image, based on said still image information, associated with said sound information corresponding with said file.

13. A recording and reproducing device comprising:

sound collecting means for collecting and outputting sound information corresponding to a result of sound collection;

photographing means for photographing and outputting still image information corresponding to a result of photographing;

recording means for converting said sound information to files in message units and recording the files on a predetermined recording medium, and recording said still image information on the recording medium in association with a corresponding file of said sound information in response to a predetermined first external operation;

display means for displaying images based on said still image information associated with respective said files of said sound information; and reproducing means for reproducing a file of said sound information associated with an image selected from among said images displayed by said display means by a predetermined second external operation, wherein said recording means sets, for each said file of said sound information, one of said images based on said still image information associated with said file as a representative image of said file, said recording means sets, as said representative image of said file, an image based on said still image information associated with said file in a period of a predetermined extension time from a sound recording start time point, the period of the predetermined extension of time being greater than zero, and said recording means sets, as said representative image of said file, a first or a last image, based on said still image information, associated with said sound information corresponding with said file.

14. A recording and reproducing method comprising:

converting sound information obtained by collecting external sound to files in message units and recording the files on a predetermined recording medium;

recording still image information obtained by photographing an outside on said recording medium in association with a corresponding file of said sound information in response to a predetermined first external operation;

displaying images, based on said still image information, associated with respective said files of said sound information; and reproducing said file of said sound information associated with an image selected, by a predetermined second external operation, from among the displayed said images; and setting, for each said file of said sound information, one of said images based on said still image information associated with said file as a representative image of said file, said setting includes setting, as said representative image of said file, an image based on said still image information associated with said file in a period of a predetermined extension time from a sound recording start time point, the period of the predetermined extension of time being greater than zero, and said setting includes setting, as said representative image of said file, a first or a last image, based on said still image information, associated with said sound information corresponding with said file.

* * * * *